Patented June 14, 1932

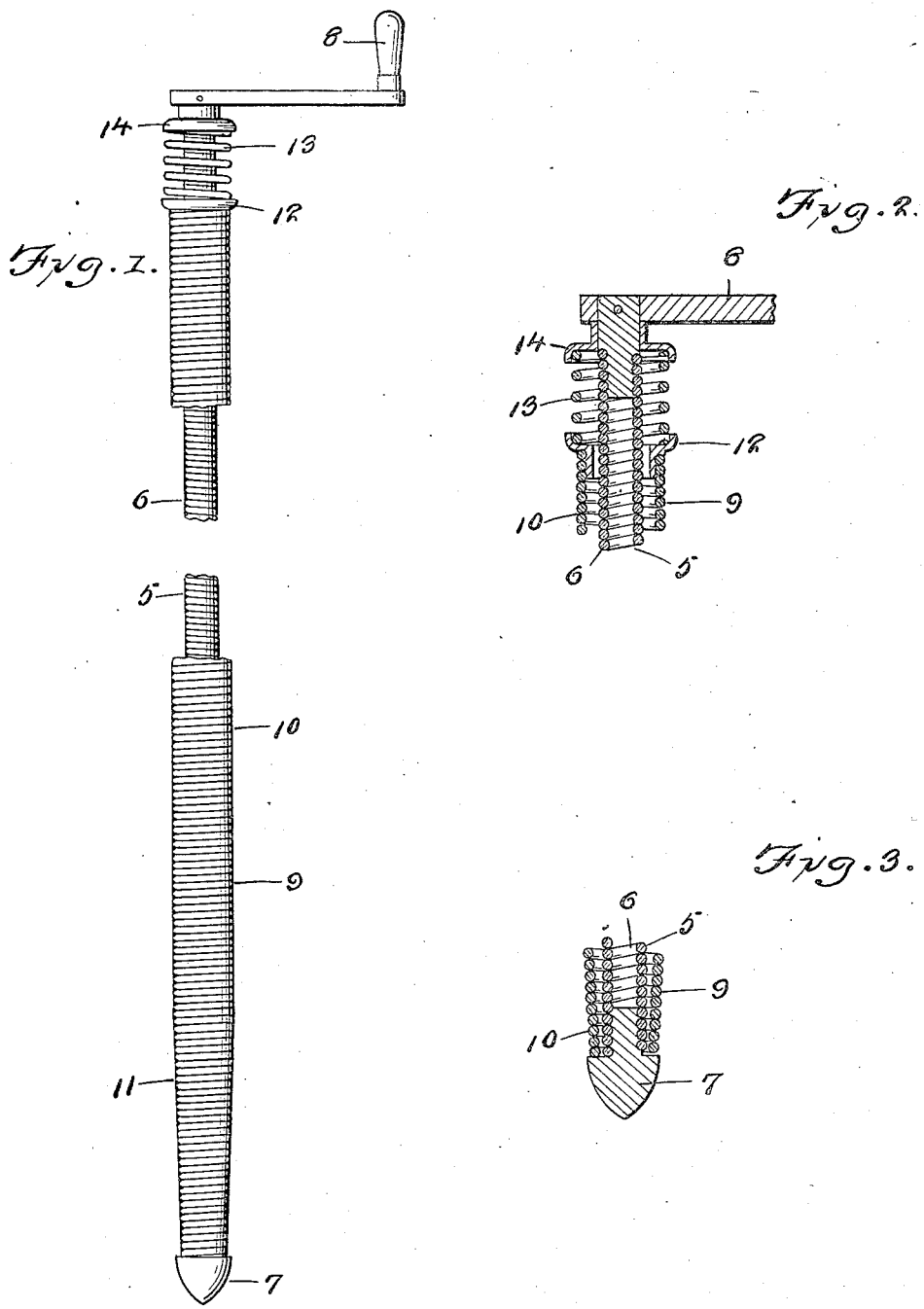

1,863,460

UNITED STATES PATENT OFFICE

GEORGE AURINGER, OF NEW ROCKFORD, NORTH DAKOTA

PIPE CLEANER

Application filed August 8, 1931. Serial No. 556,005.

The invention relates to a pipe cleaning implement.

The primary object of the invention is the provision of an implement of this character wherein sink, sewer, drain pipes or the like can be readily cleaned with dispatch without regard to the bends or irregularities thereof, as the implement in its construction is novel in form to follow the bends or irregularities of such pipe to be cleaned.

Another object of the invention is the provision of an implement of this character wherein the same is freely flexible yet is positive of operation to effect the cleaning of pipes or the like and may be conveniently operated for such cleaning, the implement being in its entirety novel in form so that a clogged or stopped-up trap and waste pipe, sewer pipe or other like pipe can be opened with dispatch.

A further object of the invention is the provision of an implement of this character which is extremely simple in construction, thoroughly reliable and efficient in its purpose, strong, durable, easy of operation and positive in action and also inexpensive to manufacture.

With these and other objects in view, the invention consists in the features of construction, combination and arrangement of parts as will be hereinafter more fully described in detail and illustrated in the accompanying drawing, which discloses the preferred embodiment of the invention, and pointed out in the claim hereunto appended.

In the accompanying drawing:—

Figure 1 is an elevation of the implement constructed in accordance with the invention and being shown partly broken away.

Figure 2 is a fragmentary vertical longitudinal sectional view through the handle end of the implement.

Figure 3 is a fragmentary vertical longitudinal sectional view through the working end of said implement.

Similar reference characters indicate corresponding parts throughout the several views in the drawing.

Referring to the drawing in detail, the implement comprises a rotatable power stem or shank 5, preferably made from a single length of coiled wire, the coils or convolutions 6 of which being closely arranged to each other and this stem or shank may be of any required length having fitted in one end a piercing nose piece 7, the latter being anchored to the stem or shank in any suitable manner and rotatable therewith, while secured to the other end of said stem or shank is an operating crank handle 8 whereby the said stem or shank can be rotated manually. It is of course obvious that the stem or shank by reason of its formation from a coiled wire is free for flexing movements to accommodate itself accordingly to the bends or irregularities in a pipe to be cleaned.

Incasing or inclosing the said stem or shank is an outer flexible tube or sheath 9, the latter being formed from a single coiled wire having the coils or convolutions 10 thereof closely related to each other or in contact with one another, the convolutions or coils 11 being gradually decreased or reduced in size toward the nose piece 7 so as to effect the tapering outwardly of said tube or sheath 9 in the direction of the nose piece. This tube or sheath 9 is of less length than the stem or shank 5 and in the end thereof remote from the nose piece 7 is a thimble 12 forming a bearing seat for a coiled expansion spring or tensioning spring 13, the latter also working against a bearing collar 14 held fast against the crank handle 8, these members 12 and 14 being in encircling relation to the stem or shank 5. The spring 13 functions to hold the nose piece 7 normally against the tapered end of the tube or sheath 9 but on pressing against the handle end of said stem or shank 5 the nose piece 7 can be displaced away from the tube or sheath 9 to effect a hammer action against and dislodge any deposit firmly gathered within a pipe when being cleaned by the implement.

It will be obvious that in the assembled relation of the stem or shank 5 and the tube or sheath 9 the implement is susceptible of free flexing so that it will follow the bends or irregularities in the contour of a pipe or other like part to be cleaned.

In practice the implement is adapted to be forced through a pipe, trap or the like and in a manner whereby a passage is opened up therein and particularly when the same has become clogged with grease or otherwise stopped up; the nose piece 7 when operated by rotating the stem or shank 5 will displace or disperse matter lodged within the pipe or the like and thus assure the opening thereof.

From the foregoing it is thought that the construction and manner of use of the implement will be clearly understood and therefore a more extended explanation has been omitted.

What is claimed is:—

An implement of the kind described comprising a closely convoluted flexible tube, a closely convoluted flexible shank rotatably supported within the tube, a tool head on said shank and protruded beyond one end of the tool, means at the other end of the shank for rotating the same, and tensioning means active between the tube and shank to normally hold the tool head against said tube but permitting displacement of the latter therefrom.

In testimony whereof I affix my signature.

GEORGE AURINGER.